US012681437B2

(12) United States Patent
Youn et al.

(10) Patent No.: US 12,681,437 B2
(45) Date of Patent: Jul. 14, 2026

(54) PROTECTIVE CASE FOR PRODUCT

(71) Applicant: Spigen Korea Co., Ltd., Seoul (KR)

(72) Inventors: Jun Yong Youn, Seoul (KR); Hye Jin Jang, Bucheon-si (KR)

(73) Assignee: Spigen Korea Co., Ltd., Seoul (KR)

( * ) Notice: Subject to any disclaimer, the term of this patent is extended or adjusted under 35 U.S.C. 154(b) by 404 days.

(21) Appl. No.: 18/460,991

(22) Filed: Sep. 5, 2023

(65) Prior Publication Data

US 2024/0385573 A1 Nov. 21, 2024

Related U.S. Application Data

(63) Continuation-in-part of application No. 29/892,635, filed on May 19, 2023, now Pat. No. Des. 1,103,166.

(30) Foreign Application Priority Data

Aug. 11, 2023 (KR) ........................ 10-2023-0105644

(51) Int. Cl.
*G04B 37/00* (2006.01)

(52) U.S. Cl.
CPC .................................. *G04B 37/005* (2013.01)

(58) Field of Classification Search
CPC .. G04B 37/005; G04B 37/22; G04B 37/0058; G04B 37/10; A45C 2011/003; A45C 13/001; A45C 11/00; G04G 17/08
See application file for complete search history.

(56) References Cited

U.S. PATENT DOCUMENTS

| | | | | |
|---|---|---|---|---|
| 4,178,751 | A * | 12/1979 | Liautaud ............ | G04B 37/1486 968/327 |
| 9,737,123 | B2 * | 8/2017 | Wright ................. | A45C 13/008 |
| 11,422,507 | B2 * | 8/2022 | Wang ................... | G04B 37/005 |
| 2021/0364992 | A1 | 11/2021 | Yang et al. | |

FOREIGN PATENT DOCUMENTS

| | | | |
|---|---|---|---|
| KR | 10-2018-0084346 | A | 7/2018 |

* cited by examiner

*Primary Examiner* — Edwin A. Leon
(74) *Attorney, Agent, or Firm* — Bridgeway IP Law Group, PLLC; Jihun Kim

(57) ABSTRACT

A protective case includes: a cover part provided with an operation unit for operating a button when some member on one side thereof is moved toward the button located on the other side thereof, and configured to be detachably coupled to a product; and a locking part configured to be coupled to the operation unit to slide between the button and the member in the forward and backward directions, and also configured to be selectively spaced apart from the member and disposed adjacent to the member according to the movement to allow or block an operation of the button by the member. The protective case selectively and rapidly activates and inactivates a pressing member used to operate a button through a locking part that is reciprocally slid with a stop protrusion interposed therebetween and thus stably maintains the position thereof.

12 Claims, 15 Drawing Sheets

PROTECTIVE CASE FOR PRODUCT

CROSS-REFERENCE TO RELATED APPLICATION

This application is a continuation-in-part application of the U.S. Design application Ser. No. 29/892,635, filed on May 19, 2023, which is incorporated herein by reference in its entirety, and additionally claims priority from Korean Patent Application No. 10-2023-0105644, filed on Aug. 11, 2023, which is also incorporated herein by reference in its entirety.

BACKGROUND

1. Technical Field

The present disclosure relates to a protective case, and more particularly, to a protective case for a product that is used for a product having a button.

2. Description of the Related Art

Unless otherwise indicated herein, the items described in this section do not correspond to prior art to the claims of the present application, and the description of an item in this section does not mean that the item is recognized as prior art.

In general, recent smart watches may be used in urban or indoor areas or outdoor areas. In order to improve convenience according to usage or environment, products specialized for specific purposes are being released.

However, in the case of smart watches fabricated to be used in outdoor areas, a button is formed to protrude further than that of existing products to improve the operational sensation of the button, so that a disadvantage occurs in that the button is erroneously operated during the use of a smart watch. Furthermore, there is a disadvantage in that erroneous operation is easily generated by a pressing member that is formed in a protective case for a smart watch in order to operate the button even in the state in which the protective case is coupled to the smart watch.

In addition, it is possible to prevent the erroneous operation of the button by disabling the button through the application of the smart watch or a terminal. However, it is impossible to set the inactive or active operation of the button with one touch, so that there are disadvantages in that a battery and time are wasted and convenience is deteriorated.

Therefore, there is a demand for a technology capable of locking the pressing member through operation with one touch while maintaining the operational sensation of the button through the pressing member formed in the protective case and stably maintaining the locking state of the pressing member even during outdoor activities.

In connection with this, U.S. Patent Application Publication No. 2021-0364992 discloses a protective case for a smart watch, and Korean Patent Application Publication No. 10-2018-0084346 discloses a connection part 702 in FIG. 8 in connection with a smart watch and a watch band. However, the existing inventions do not disclose a technology for preventing the erroneous operation of a button while protecting the outside of a product.

SUMMARY

An object of the present disclosure is to provide a protective case that selectively and rapidly activates and inactivates a pressing member used to operate a button through a locking part that is reciprocally slid with a stop protrusion interposed therebetween and thus stably maintains the position thereof.

Furthermore, it is obvious that objects of the present disclosure are not limited to the object mentioned above and other objects not mentioned above may be derived from the following description.

According to an aspect of the present disclosure, there is provided a protective case coupled to a product having a button, the protective case including: a cover part provided with an operation unit for operating the button when some member on one side thereof is moved toward the button located on the other side thereof, and configured to be detachably coupled to the product; and a locking part configured to be coupled to the operation unit to slide between the button and the member in the forward and backward directions, and also configured to be selectively spaced apart from the member and disposed adjacent to the member according to the movement to allow or block an operation of the button by the member.

The locking part may be formed to be fixed in a stop protrusion manner when moved forward or backward, and the distance by which the member is movable may selectively increase and decrease in accordance with forward or backward movement.

The operation unit may include: a first cover formed in a shape surrounding a through hole open to both sides, and configured to be coupled to the locking part; a pressing member configured such that one end thereof is connected to the first cover to be elastically deformed in the through hole and the other end thereof extends forward in the state of being separated from the first cover and intersects a portion of the locking part; and a protruding member configured to extend toward the other side between one end and other end of the pressing member and be disposed behind the locking part.

The operation unit may further include a stop member configured to protrude from the bottom of the first cover between the locking part and the button up to a horizontal line lower than the pressing member and come into close contact with the locking part and provided with an inclined surface extending obliquely toward one side and the top on the other side.

The locking part may include: a slider configured such that one side thereof is coupled to the first cover in a shape surrounding a front, top and bottom of an insertion space where the pressing member is disposed and the other side thereof covers the other side of the insertion space; a stopper configured such that a portion of the other side of the slider protrudes into the insertion space and is selectively disposed close to the other end of the pressing member and separated from the other end of the pressing member according to the movement of the slider; and a lever formed such that a portion of one side of the slider protrudes to one side and slides in the first space.

The locking part may further include a stopper configured such that a portion of the other side of the slider protrudes toward the insertion space while being spaced apart from the front of one side of the slider to form an insertion recess separated from the insertion space in front thereof.

The slider may be configured such that rail grooves into which portions of the operation unit are inserted are formed in the top and bottom thereof and protrusions are formed inside the rail grooves.

The operation unit may further include a stop protrusion formed to protrude from the first cover and be inserted into the rail groove corresponding to the rear of the protrusion in the state in which the slider has been moved forward, and the protrusion may be moved behind the stop protrusion while elastically deforming the stop protrusion and the first cover when the lever is moved forward or backward by applying a predetermined force or more.

The operation unit may further include a pressing protrusion formed to protrude from one side of the other end of the pressing member to one side by a predetermined distance to be longer than the lever.

The operation unit may be configured such that a portion of the first cover adjacent to the front of the other side of the slider is depressed forward by the first distance so that a sliding groove in which an internal space is open toward the rear and the other side is formed.

The locking part may further include a guide member formed to protrude forward from the front of the other side of the slider by the first distance and configured to be selectively inserted into the sliding groove and separated from the sliding groove in response to the operation of the slider.

The operation unit may further include buffer members configured such that portions of the other side of the other end of the pressing member vertically spaced apart from each other extend toward the other side in the state of being connected to the protruding member and are disposed behind the stopper.

The stopper may extend vertically, one side corner of the rear of the stopper may be tapered and formed as a curved surface, and portions of the upper and lower portions of the stopper may be formed to extend rearward while contracting and be elastically deformed by the pressure of the buffer members or the pressing member.

The pressing member may be configured such that an insertion member is formed in such a manner that a portion of the edge of the other side of the pressing member protrudes toward the other side by a predetermined distance.

The stopper may be configured such that an insertion recess is formed by recessing a portion of one side of the front of the stopper by a predetermined distance toward the other side and a portion of the insertion member is inserted into the insertion recess while being deformed by the elastic movement of the pressing member.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1A:
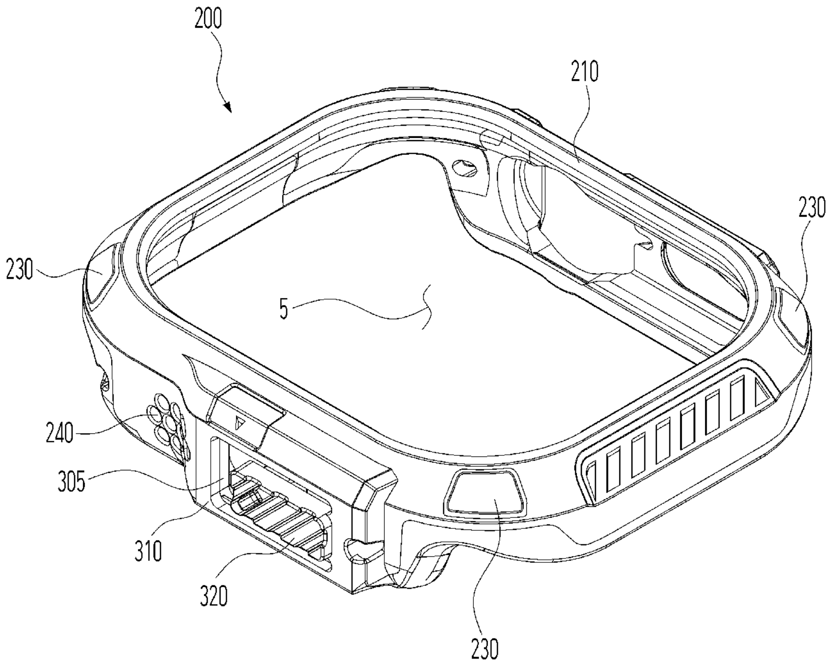
FIG. 1A is a diagram showing a protective case according to an embodiment of the present disclosure.
Figure 1B:
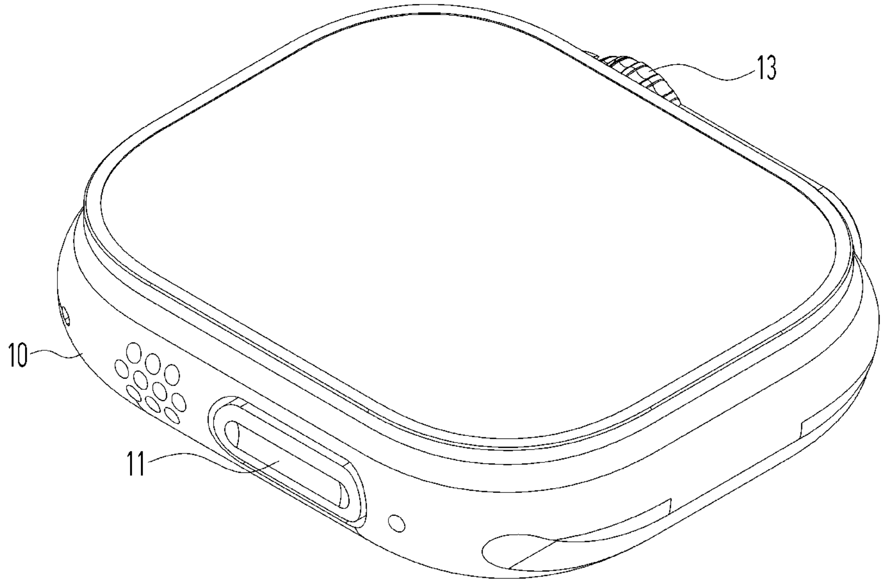
FIG. 1B is a diagram showing an example of a product to which the protective case may be coupled.
Figure 1C:
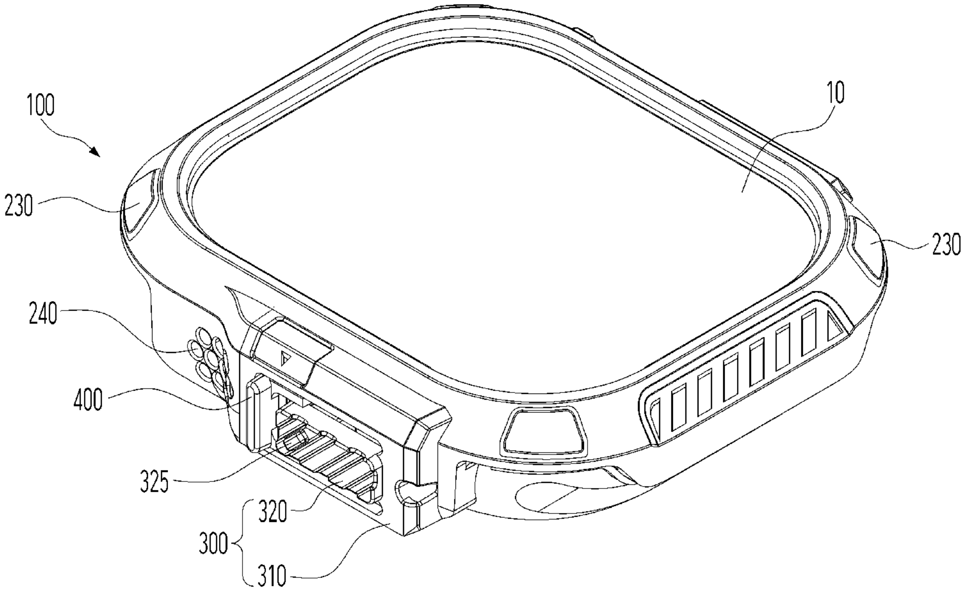
FIG. 1C is a diagram showing the protective case coupled to the product according to the embodiment of the present disclosure.

The configurations, operations, and effects of protective cases according to embodiments will be described below with reference to the accompanying drawings. For reference, in the following drawings, each component may be omitted or schematically illustrated for the sake of convenience and clarity, and the size of each component does not reflect the actual size of the component. Furthermore, like reference numerals refer to like components throughout the specification, and reference numerals for like components may be omitted in each drawing.

Referring to FIGS. 1 to 4, a protective case 100 includes a cover part 200 and a locking part 400.

The protective case 100 is detachably coupled to a product 10 including a smart watch. The protective case 100 protects the edge portions of the product 10, improves the convenience of the operation of a first button 11 formed in the product 10, and effectively prevents erroneous operation.

The cover part 200 includes a cover body 210, air pockets 230, and an operation unit 300, and a plurality of through holes 240 are formed on one side of the cover part 200.

The cover part 200 is formed in a shape surrounding a hollow 5, and is detachably coupled to the outside of the product 10. A portion of one side of the cover part 200 is formed to be elastically deformed and operate a first button 11 in response to the operation of a user.

Figure 2A:
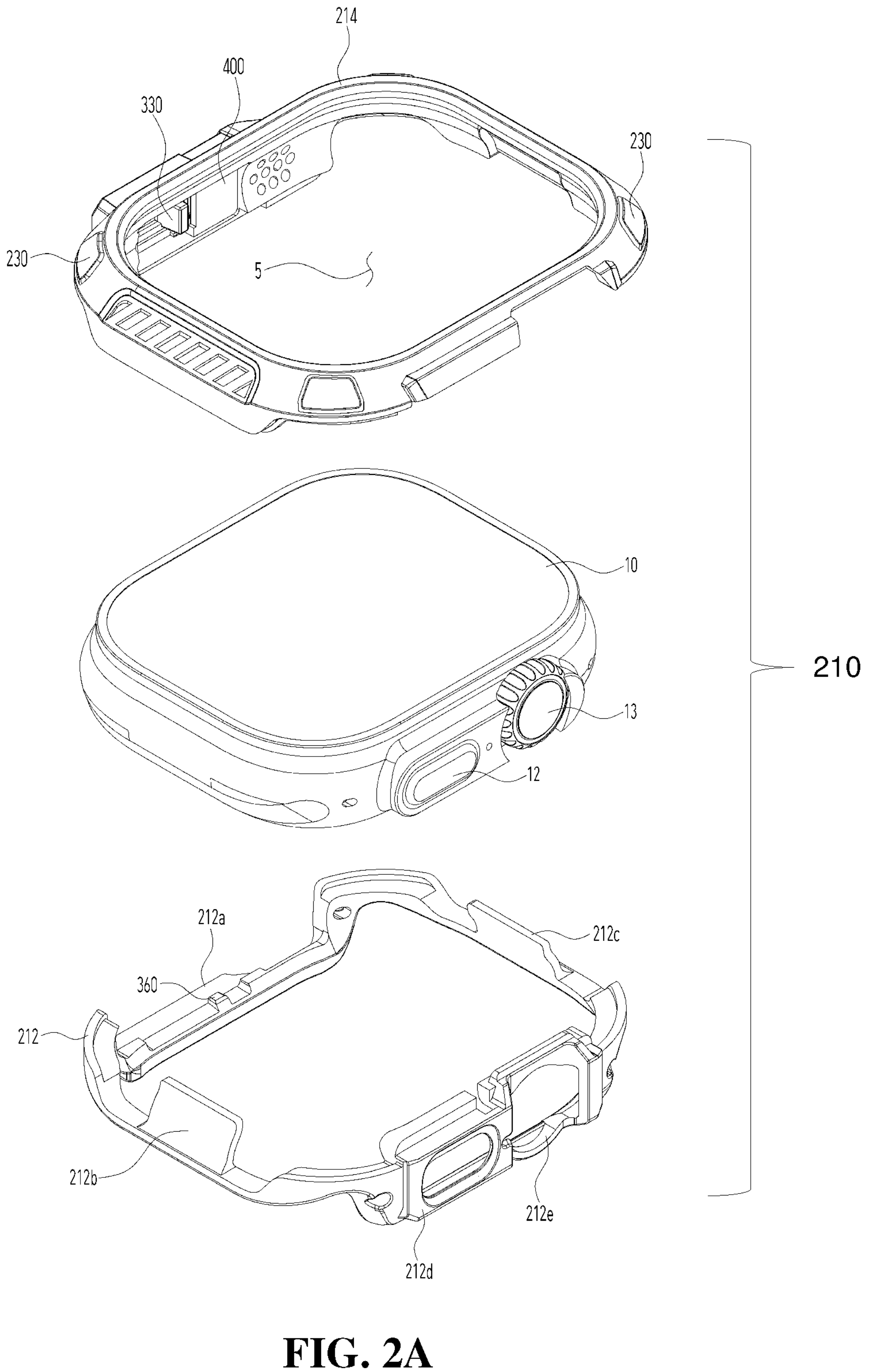
FIG. 2A shows an exploded perspective view of the protective case of FIG. 1.
Figure 2B:
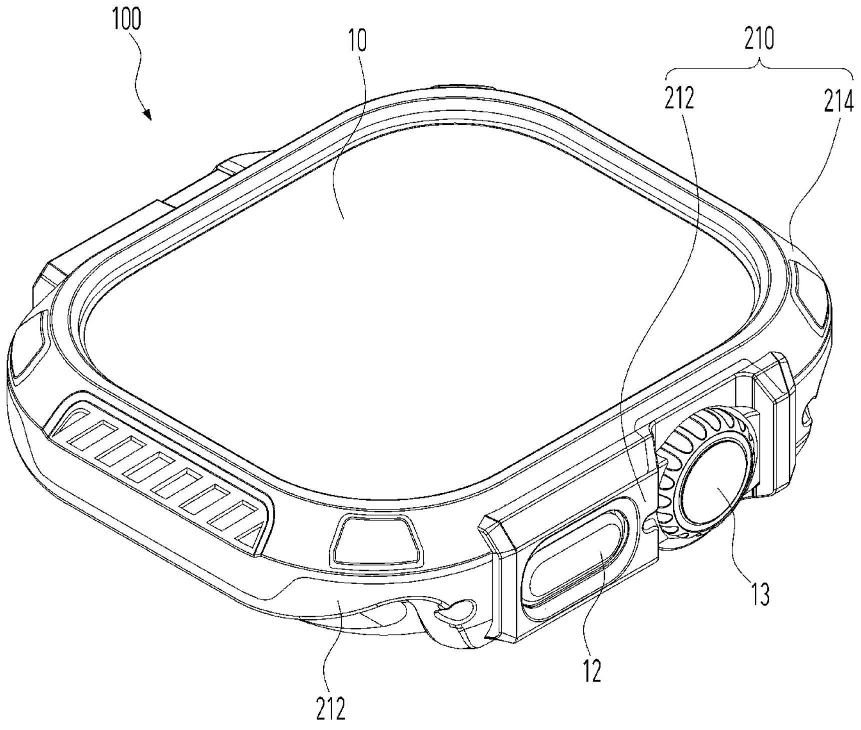
FIG. 2B shows a perspective view of the protective case of FIG. 1 coupled to the product.

Referring to FIG. 2, the cover body 210 and the operation unit 300 are fabricated by combining a lower cover 212 and an upper cover 214, and the lower cover 212 is made of a polymer material having higher elasticity than the upper cover 214.

An elastic member 212*a*, attachment members 212*b* and 212*c*, a first cover member 212*d*, and a second cover member 212*e* are formed on the lower cover 212.

The elastic member 212*a* is coupled to the bottom of one side of the upper cover 214 through bonding. A stop member 360 to be described later is formed to protrude upward from the center of the elastic member 212*a*. The locking part 400 may be selectively inserted into the through hole 305, formed in the operation unit 300, and separated from the operation unit 300 through the elasticity of the elastic member 212*a*.

The attachment member 212*b* is formed in the shape of a plate obliquely extending forward and upward from the rear edge of the lower cover 212. The attachment member 212*b* is surface-coupled to the inner surface of the rear edge of the upper cover 214 in the state in which the lower cover 212 and the upper cover 214 are coupled to each other.

The attachment member 212*c* is formed in the shape of a plate obliquely extending rearward and upward from the front edge of the lower cover 212. The attachment member 212*c* is surface-coupled to the inner surface of the front edge of the upper cover 214 in the state in which the lower cover 212 and the upper cover 214 are coupled to each other.

The first cover member 212*d* is formed in the shape of a rectangular frame surrounding the portion of the product 10 corresponding to a second button 12 and the periphery thereof formed on the other side of the product 10, and is coupled to the lower portion of the other edge of the upper cover 214.

The second cover member 212*e* is formed in the shape of a frame surrounding the portion of the product 10 corresponding to a dial 13 and the periphery thereof formed on the front of the other side of the product 10, and is coupled to the lower portion of the other edge of the upper cover 214.

The other side of the cover part 200 is more elastic than one side thereof due to the first and second cover members 212*d* and 212*e*. Accordingly, it is preferable that one side of the cover part 200 is combined with one side of the product 10 where the first button 11 is located and then the other side of the cover part 200 is combined with the other side of the product 10 while the first and second cover members 212*d* and 212*e* are being deformed.

The cover body 210, the air pockets 230, and the operation unit 300 may be made of the same elastic polymer material in an integrated form, in which case there is an advantage in that the manufacturing cost of the cover part 200 is significantly reduced.

The cover body 210 is formed in the shape of a rectangular frame surrounding the hollow 5. The air pockets 230 are coupled to respective positions corresponding to the upper portions of the corners of the cover body 230. The other side of the cover body 210 is formed to be coupled with the other side of the product 10 while surrounding the dial 13 and the second button 12.

Each of the air pockets 230 has an isosceles trapezoidal section and is formed in the shape of a quadrangular pillar extending upward or downward. The bottom surface of the air pocket 230 is surface-coupled to the upper portion of the cover body 210 in the state in which air has been injected and sealed therein.

The plurality of air pockets 230 are coupled to the positions corresponding to the corners of the cover body 210. The plurality of air pockets 230 effectively protect the product 120 by relieving the pressure applied to the corner portions of the product 10 exposed to the outside and also reducing the pressure transmitted to the product 10 through the cover body 210.

The plurality of through holes 240 are formed on one side of the cover part 200 corresponding to the front of the operation unit 300, and are formed to communicate with a plurality of respective speaker holes for a speaker formed on one side of the product 10.

Referring to FIGS. 4 to 8, the operation unit 300 includes a first cover 310, a pressing member 320, a pressing protrusion 325, a protruding member 330, buffer members 340 and 350, a stop member 360, first rails 370 and 374, a first stop protrusion 372, second rails 380 and 384, and a second stop protrusion 382. A through hole 305, a first space 306, second spaces 307 and 308, first catch depressions 371 and 381, and second catch depressions 373 and 383 are formed in the operation unit 300.

The operation unit 300 is formed to be connected to the lower part of one side of the cover body 210. The operation unit 300 is formed to operate the first button 11 when some members on one side of the operation unit 300 are elastically moved toward the first button 11 located on the other side.

The first cover 310 is formed in the shape of a rectangular frame surrounding the through hole 305 formed on one side of the first button 11. The top surface of the first cover 310 is connected to the lower portion of one side of the cover body 210, and is coupled to one side of the product 10 using a stop protrusion.

A portion of the front side of the first cover 310 is formed in the shape of a plate extending long forward and rearward, and the plurality of through holes 240 connecting the hollow 5 and one side of an external space are formed, so that the speaker holes formed in the product 10 are connected with the outside.

One end of the pressing member 320 is formed in the shape of a plate having a relatively large area formed on both sides and extending forward and rearward, and is connected from the rear of the through hole 305 to the center of the inner surface of the rear of the first cover 310.

The other end of the pressing member 320 extends forward to be shorter than the one end in the state of being spaced apart from the upper and lower edges of the first cover 310 while maintaining the same shape as the one end, and intersects a portion of the locking part 400.

A plurality of oblique linear protrusions 324 extending obliquely to be parallel to each other and disposed at equal intervals in the rear-front direction are disposed to protrude toward one side on one side of the pressing member 320.

The oblique linear protrusions 324 are fabricated by taking into consideration the fact that the pressing member 320 is disposed on one side of the product 10, so that it is not easily visible. The oblique linear protrusions 324 are advantageous in that the position of the pressing member 320 is easily recognized through the tactile sensation generated when a user's finger comes into contact with the oblique linear protrusions 324.

A pressing protrusion 325 is formed in the shape of a hexahedron that is parallel to the oblique linear protrusions 324 and extends to be shorter and oblique. The pressing protrusion 325 is connected to one side of the oblique linear protrusion 324 corresponding to the front side of the plurality of oblique linear protrusions 324.

The pressing protrusion 325 guides a user to a pressing position so that the user can effectively operate the first button 11 within a short period of time by moving the pressing member 320 to the other side after completing the positioning of the pressing member 320 through the oblique linear protrusions 324.

Therefore, the user may conveniently identify the pressing position required to effectively operate the first button 11 in such a manner as to determine the position of the pressing member 320 by detecting the plurality of oblique linear protrusions 324 by touch in a first step and then detect the pressing protrusion 325 at an adjacent position in a second step.

Figure 5A:
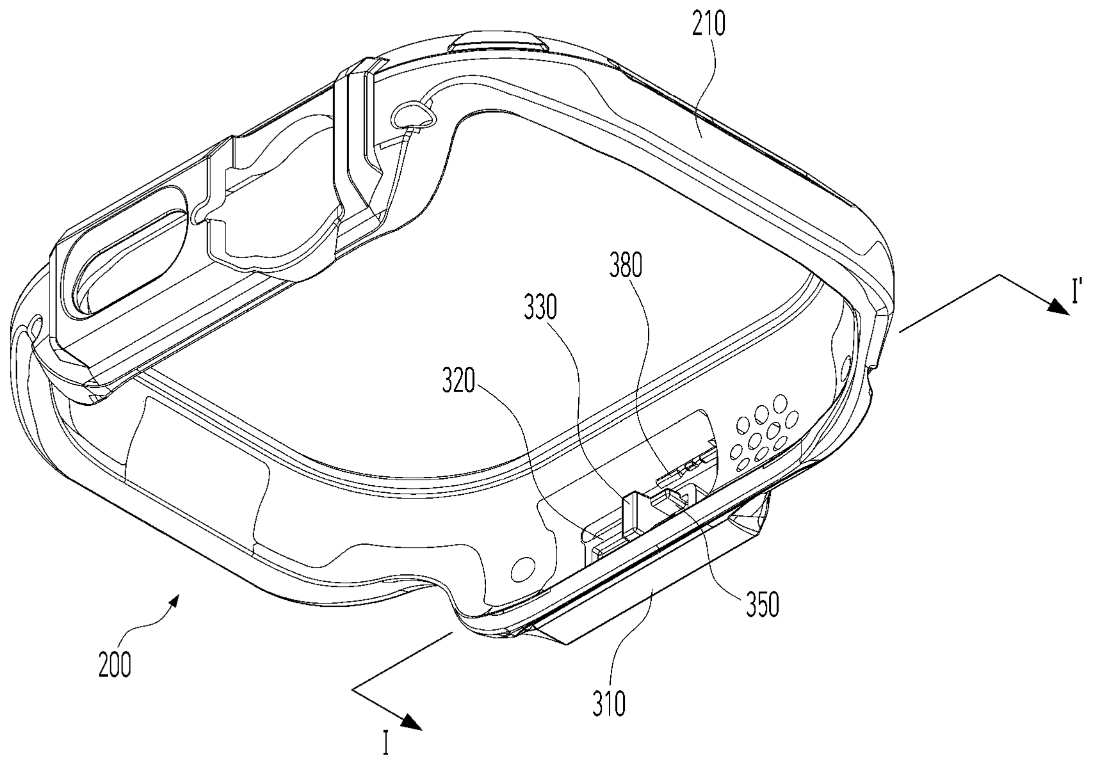
FIG. 5A shows a perspective view of the protective case of FIG. 1 viewed from another angle.
Figure 5B:
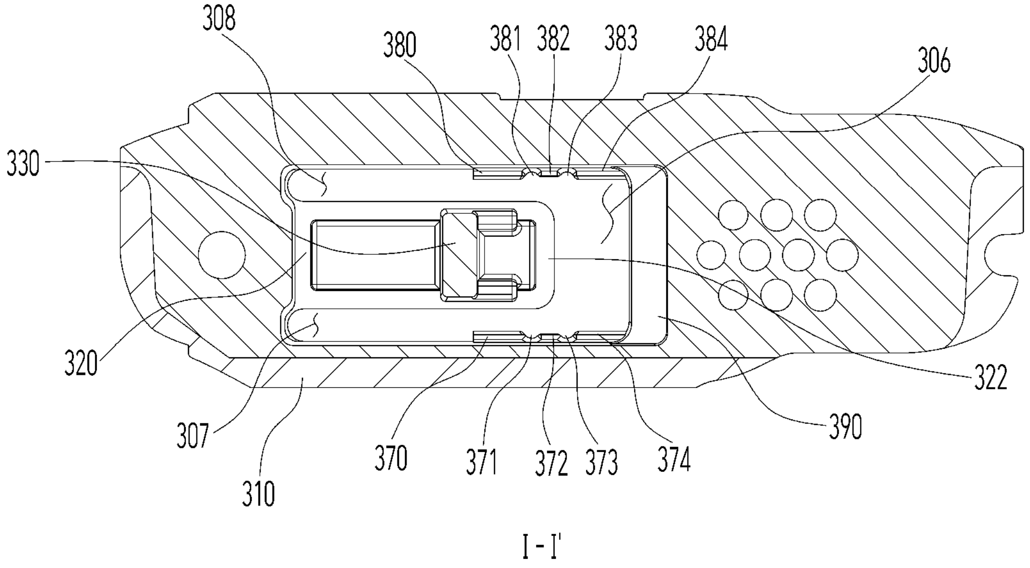
FIG. 5B shows an enlarged sectional view taken along line I-I' of the perspective view of FIG. 5A.
Figure 6A:
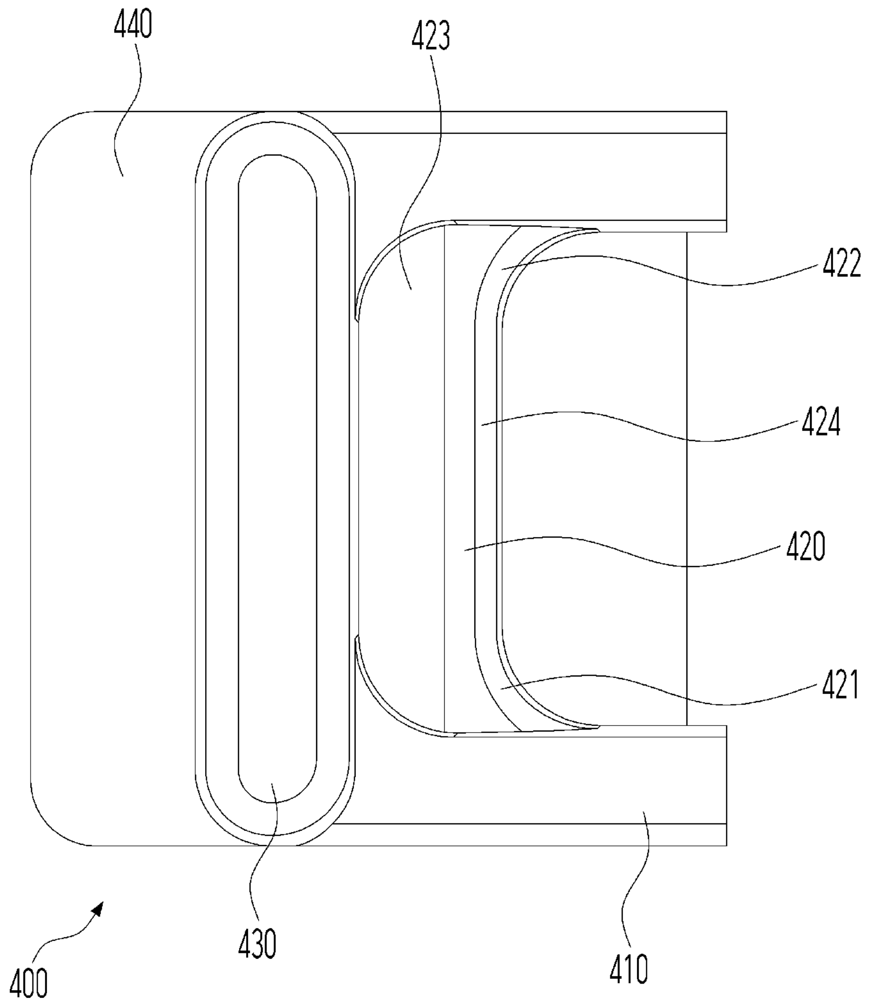
FIG. 6A shows an enlarged side view of the locking part of FIG. 5 viewed from another angle.
Figure 6B:
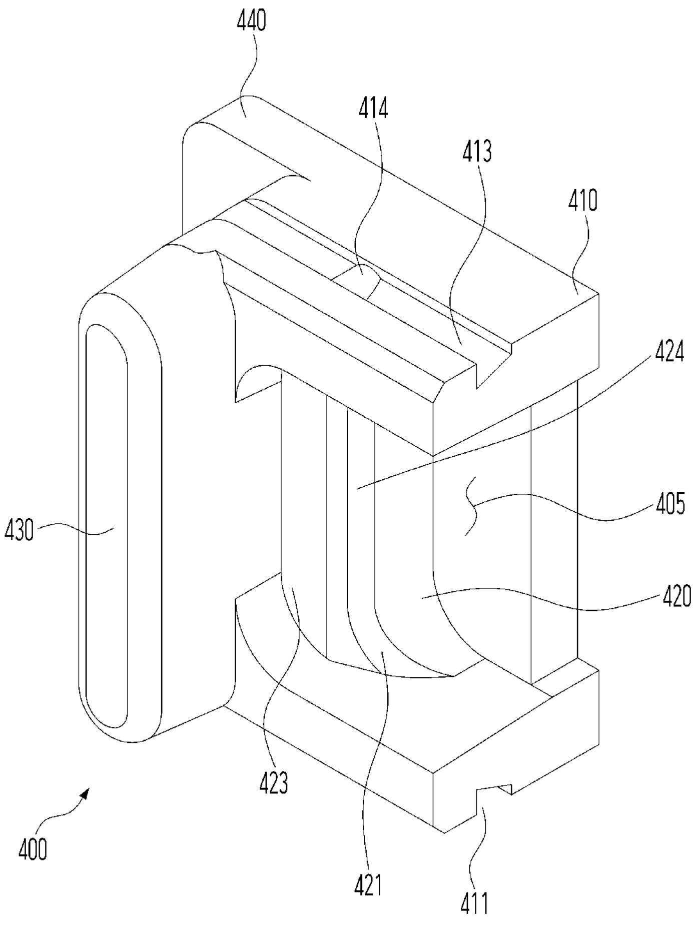
FIG. 6B shows a perspective view of the locking part of FIG. 5.

Referring to FIGS. 5 and 6, an insertion member 322 is formed in such a manner that a portion of the edge of the other side of the pressing member 320 protrudes toward the other side by a predetermined distance, so that the insertion member 322 has the advantage of improving the durability of the pressing member 320. When a portion is inserted into the insertion recess 423 of the locking part 400, there is an advantage in that the deformation of the pressing member 320 by the locking part 400 is stably suppressed.

The other end of the pressing member 320 is spaced apart from the inner surface of the front side of the first cover 310 with the first space 306 corresponding to the front of the through hole 305 interposed therebetween. A portion of the lever 430 of the locking part 400 to be described later protrudes toward one side past the first space 306.

A second space 307 corresponding to the lower portion of the through hole 305 is formed between the bottom of the pressing member 320 and the first cover 310. A portion of the slider 410 of the locking part 400 is inserted into the second space 307 and selectively slides forward and rearward by a first distance.

A second space 308 is formed between the top of the pressing member 320 and the first cover 310. A portion of the slider 410 of the locking part 400 is inserted into the second space 308 and selectively slides forward and rearward by the first distance.

Accordingly, the second spaces 307 and 308 guide the locking part 400 to maintain the state of being coupled with the operation unit 300 while selectively moving forward and rearward by the first distance.

One end of the protruding member 330 is formed in the shape of a hexahedron extending to be longer vertically, and is connected to the other side of the pressing member 320 corresponding to a portion between one end and the other end of the pressing member 320. The other end of the protruding member 330 extends toward the other side by a predetermined distance from the one end to a position adjacent to the first button 11 through the rear of the locking part 400 coupled to the operation unit 300.

The other end of the protruding member 330 is formed to protrude further toward the other side than the other side surface of the locking part 400 coupled to the operation unit 300. When the other end of the pressing member 320 moves toward the other side, the protruding member 330 presses the first button 11 while moving toward the other side.

When the other end of the pressing member 320 elastically moves toward the other side by a predetermined distance in the state in which the cover part 200 is coupled with the product 10, the protruding member 330 is moved toward the other side together and operates the first button 11 by moving the first button 11 toward the other side.

A buffer pad made of a polymer material having relatively low hardness and strength and relatively high elasticity may be attached to the other side of the other end of the protruding member 330. Through this, there is an advantage in that damage to the first button 11 is prevented.

The distance between the front side of the protruding member 330 and the inner surface of the front side of the first cover 310 located on one side of a sliding groove 390 is the same as the front-rear length of the locking part 400. The locking part 400 disposed between the pressing member 320 and the stop member 360 is guided to selectively slide forward and rearward by the pressing member 320 and the stop member 360.

The buffer member 340 extends to be shorter than the protruding member 330 toward the other side while maintaining the state in which a portion of the lower portion of the other side of the other end of the pressing member 320 is in close contact with the protruding member 330, and the front surface of the buffer member 340 is disposed behind the front surface of the other end of the pressing member 320.

The buffer member 350 extends to be shorter than the protruding member 330 toward the other side while maintaining the state in which a portion of the upper portion of the other side of the other end of the pressing member 320 is in close contact with the protruding member 330, and the front surface of the buffer member 350 is disposed behind the front surface of the other end of the pressing member 320.

Referring to FIGS. 5 to 10, in the state in which the locking part 400 has slid rearward, a portion of the locking part 400 is disposed to intersect the other sides of the buffer members 340 and 350, and the locking part 400 blocks the movement of the pressing member 320 and the buffer members 340 and 350 to the other side. Accordingly, there is an advantage in that the operation of the first button 11 by the protruding member 330 is effectively suppressed.

Figure 3A:
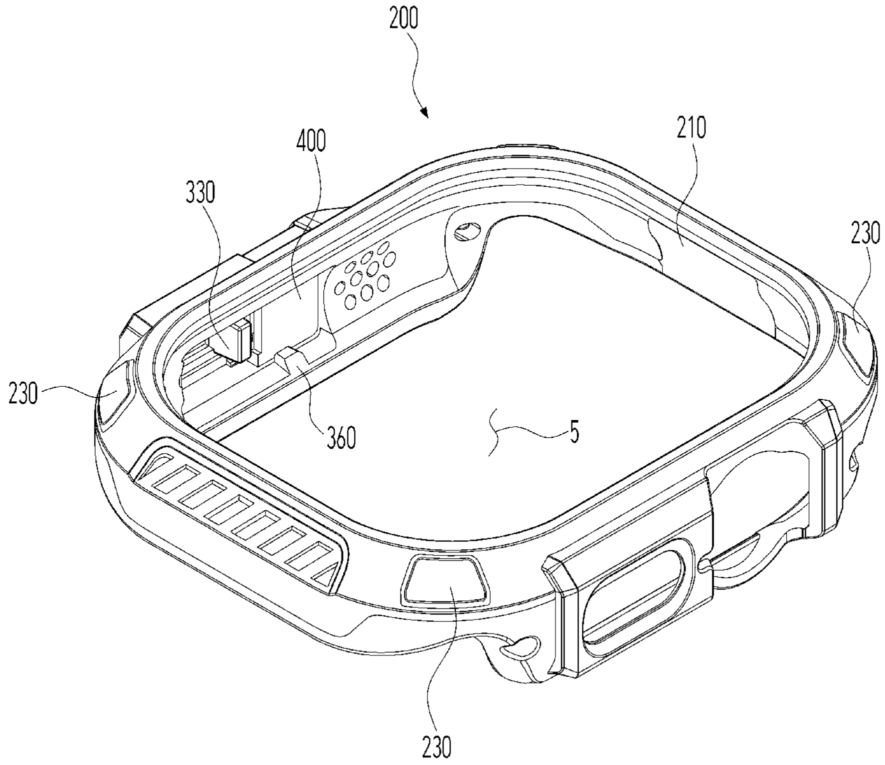
FIG. 3A shows a perspective view of the protective case of FIG. 1 viewed from another angle.
Figure 3B:
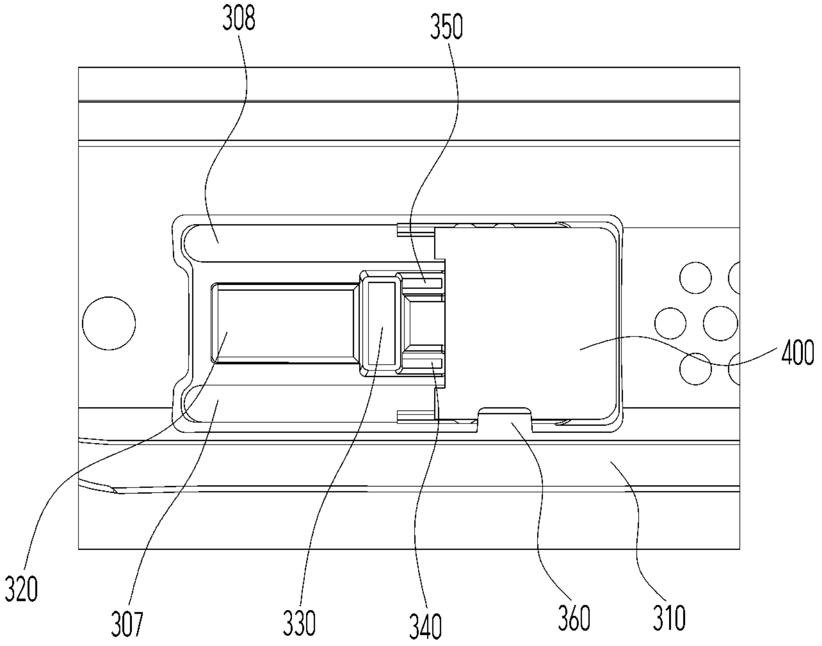
FIG. 3B shows a partially enlarged view of the other side of an operation unit.

Referring to FIG. 3, the stop member 360 is formed in the shape of a hexahedron in which the portion of the inner surface of the first cover 310 corresponding to the lower portion of the through hole 305 between the locking part 400 coupled to the cover part 200 and the first button 11 protrudes upward while contracting up to a position corresponding to a horizontal line lower than the bottom of the pressing member 320 and an inclined surface is formed on the other side.

The inclined surface is formed as the upper edge of the other side of the stop member 360 is processed to be tapered, and is formed in a shape extending obliquely toward one side and the top, and guides the locking part 400 through smooth movement in the process in which the locking part 400 is inserted into the through hole 305 in the hollow 5 and coupled with the cover part 200.

Referring to FIGS. 3 to 6, the locking part 400 is coupled to the first cover 310 in a rail coupling manner to selectively slide forward and rearward between the stop member 360 and the other end of the pressing member 320, and the area of the other side of the locking part 400 open to the hollow 5 is larger than the area in close contact with the stop member 360. When the replacement of the locking part 400 is necessary, the locking part 400 may be conveniently separated from the operation unit 300 and then the locking part 400 may be replaced.

There is an advantage in that, in the state in which the locking part 400 is inserted into the through hole 305 and coupled to the cover part 200 to enable forward and rearward sliding movement, one side surface of the stop member 360 comes into close contact with the other side surface of the locking part 400, and guides the locking part 400 through sliding movement and prevents the locking part 400 from being separated.

When the stop member 360 and the first cover 310 are moved downward by a predetermined distance, the stop member 360 is moved downward by the deformation of the first cover 310, and the locking part 400 is easily separated as the distance between the stop member 360 and the inner surface of the upper portion of the first cover 310 increases.

Referring to FIGS. 4 to 7, the first rail 370 extends forward and rearward by a predetermined distance and has a rectangular sectional structure in which the height of one side thereof is longer than that of the other side thereof. The bottom of the first rail 370 is connected to the inner surface of the first cover 310 at a position corresponding to the bottom of the other end of the pressing member 320.

The first stop protrusion 372 is formed in the shape of a hexahedron extending forward and rearward. The bottom of the first stop protrusion 371 is connected to the inner surface of the first cover 310 at a position spaced apart from each other forward with the first rail 370 and the first catch depression 371 interposed therebetween.

The first rail 374 extends forward and rearward by a predetermined distance, and has a rectangular sectional structure in which the height of one side thereof is longer than that of the other side thereof. The bottom of the first rail 374 is connected to the inner surface of the first cover 310 at a position spaced apart from each other forward with the first stop protrusion 372 and the second catch depression 373 interposed therebetween.

The distance between the center of the first catch depression 371 and the center of the second catch depression 373 is formed to be the first distance, through which the locking part 400 coupled to the operation unit 300 selectively slides forward and rearward by the first distance.

The second rail 380 extends forward and rearward by a predetermined distance, and has a rectangular sectional structure in which the height of one side thereof is longer than that of the other side thereof. The top of the second rail 380 is connected to the inner surface of the first cover 310 at a position corresponding to the same vertical line as the other end of the pressing member 320 and the first rail 370.

The second stop protrusion 382 is formed in the shape of a hexahedron extending forward and rearward, and is spaced apart from the second rail 380 forward with the first catch depression 381 interposed therebetween and disposed on the same vertical line as the first stop protrusion 372. The top of the second stop protrusion 382 is connected to the inner surface of the first cover 310.

The second rail 384 extends forward and rearward by a predetermined distance, has a rectangular sectional structure in which the height of one side thereof is longer than that of the other side thereof, and is spaced apart from the second stop protrusion 382 with the second catch depression 383 disposed therebetween and disposed on the same vertical line as the first rail 374. The top of the second rail 384 is connected to the inner surface of the first cover 310.

The distance between the center of the first catch depression 381 and the center of the second catch depression 383 is formed to be the first distance, through which the locking part 400 coupled to the operation unit 300 selectively slides forward and rearward by the first distance.

Since the first rails 370 and 374 each have a rectangular sectional structure in which the height of one side thereof is longer than that of the other side thereof, a top inclined surface extending from one side thereof toward the bottom of the other side thereof is formed on the top thereof.

Since the second rail 380 and 384 each have a rectangular sectional structure in which the height of one side thereof is longer than that of the other side thereof, a top inclined surface extending from one side thereof toward the top of the other side thereof is formed on the bottom thereof.

In the process of moving the locking part 400 toward one side in the hollow 5, passing the locking part 400 by the stop member 360, and coupling the locking part 400 to the operation unit 300, the movement of the locking part 400 to the first space 306 is smoothly performed by the upper and lower inclined surfaces. Each of the first rails 370 and 374 and the second rails 380 and 384 is smoothly inserted into each of first and second rail grooves 411 and 413.

In contrast, in the process of separating the locking part 400 from the operation unit 300 by moving it to the other side, the movement of the locking part 400 to the other side is blocked by one side surfaces of the first rails 370 and 374 and the second rails 380 and 384 and one side surface of the stop member 360. Accordingly, even when the pressure of the pressing member 320 is applied to the locking part 400, the sliding coupling state between the operation unit 300 and the locking part 400 is stably maintained.

Figure 4A:
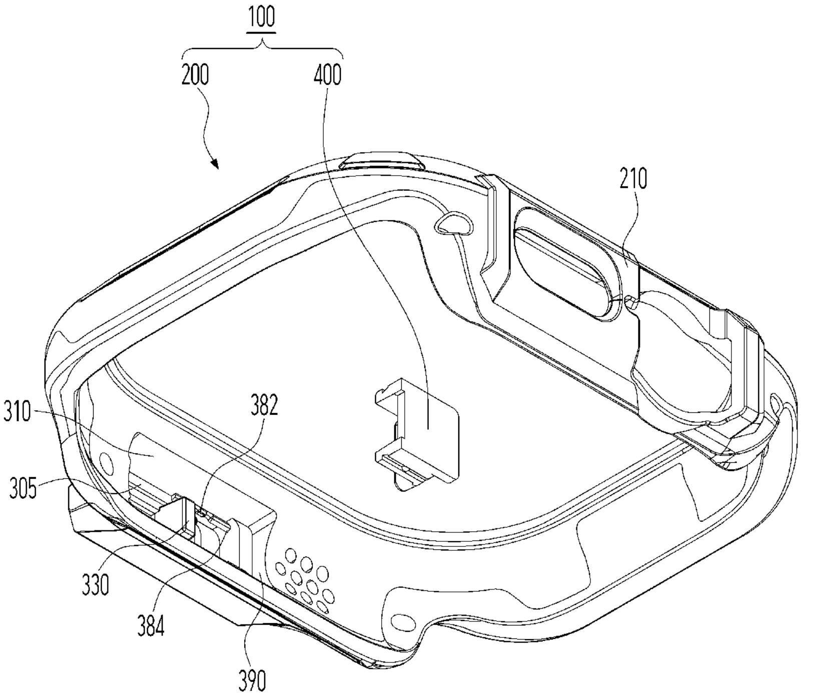
FIG. 4A shows an exploded perspective view of the protective case of FIG. 1 including a cover part and a locking part viewed from another angle.
Figure 4B:
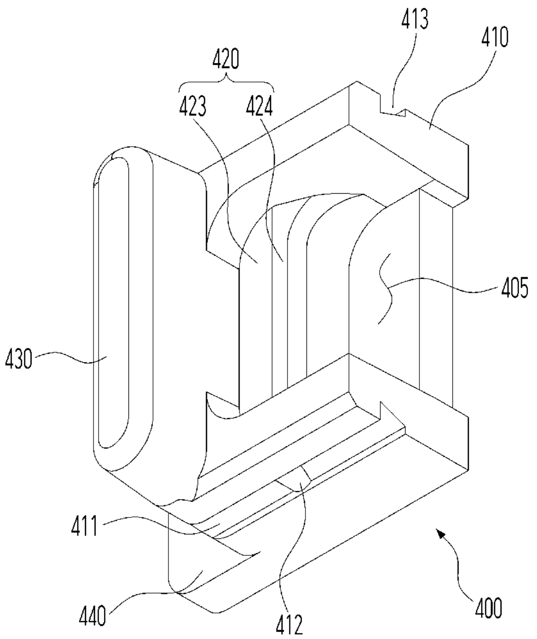
FIG. 4B shows an enlarged view of a the locking part.
Figure 10:
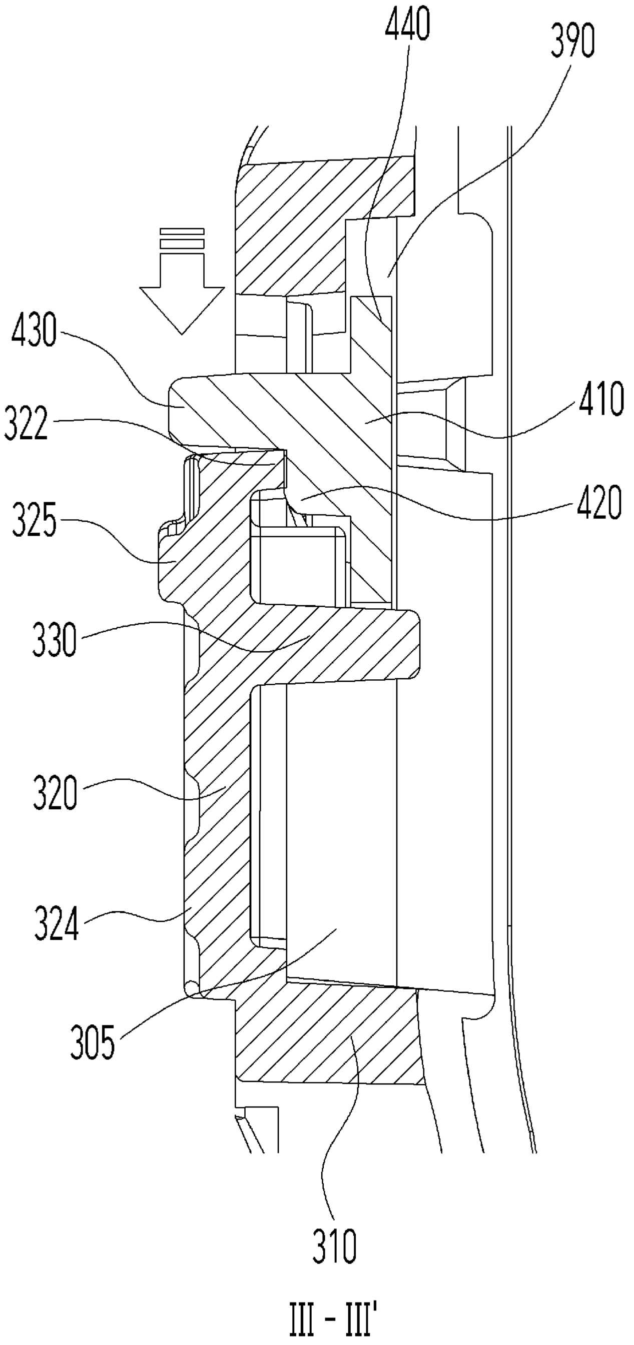
FIG. 10 is a partial sectional view of the protective case taken along line III-III' of FIG. 9A in the state in which the locking part of FIG. 9 has been moved rearward.

Referring to FIGS. 4, 5 and 10, the sliding groove 390 is formed in such a manner that a portion of the inner surface of the front side of the first cover 310 adjacent to the front side of the other side of the slider 410 to be described later is depressed forward by the first distance so that the inner space is opened toward the rear and the other side.

Referring to FIGS. 4 to 6, the locking part 400 includes a slider 410, a first protrusion 412, a second protrusion 414, a stopper 420, connection members 421 and 422, a lever 430 and a guide member 440, and an insertion space 405, the first rail groove 411, the second rail groove 413, and the insertion recess 423 are formed in the locking part 400.

The locking part 400 is detachably coupled to the operation unit 300 to selectively slide forward and rearward, and is formed to selectively allow and block the operation of the operation unit 300 while being disposed or separated between the first button 11 and the operation unit 300 according to the sliding movement.

More specifically, the upper and lower portions of the locking part 400 are detachably coupled to the operation unit 300 to enable multi-stage sliding movement in the forward and rearward directions, and extend in a step shape toward one side and the front and move between the pressing member 320 and the stop member 360. According to the forward movement, the movable distance toward the first button 11 of the pressing member 320 increases.

The locking part 400 is moved toward one side by a predetermined distance in the hollow 5, is guided to be inserted into the first space 306 in the through hole 305 by the inclined surface of the stop member 360, and is selectively slid forward and rearward between the other end of the pressing member 320 and the stop member 360.

In the process in which the locking part 400 slides, the upper and lower surfaces of the locking part 400 are coupled with the operation unit 300 through rails while coming into close contact with the inner surface of the first cover 310, and the locking part 400 slides in the state of being in close contact with one side surface of the stop member 360.

More specifically, one side of the slider 410 is formed in a shape surrounding the front and upper and lower portions of the insertion space 405 into which the pressing member 320 has been inserted, and is coupled to the first cover 310 to enable multi-stage sliding in the forward and rearward directions.

A portion of the lower portion of one side of the slider 410 is inserted into the second space 307 located under the other end of the pressing member 320, and selectively slides forward and rearward in the second space 307 according to the forward or rearward sliding movement of the locking part 400.

A portion of the upper portion of one side of the slider 410 is inserted into the second space 308 located over the other end of the pressing member 320, and selectively slides forward and rearward in the second space 308 according to the forward or rearward sliding movement of the locking part 400.

The other side of the slider 410 is formed in the shape of a rectangular plate in which both sides thereof have a relatively large area and is also formed to cover the other side of the insertion space 405. In the state in which the locking part 400 is coupled to the operation unit 300, the other side of the slider 410 is in close contact with one side of the stop member 360.

When one side of the slider 410 slides to a position in front of the first cover 310 through the first rails 370 and 374, the first stop protrusion 372, the second rails 380 and 384, and the second stop protrusion 382, it is coupled with the first cover 310 so that it is stably seated and fixed.

When one side of the slider 410 slides to a position behind the first cover 310 through the first rails 370 and 374, the first stop protrusion 372, the second rails 380 and 384, and the second stop protrusion 382, it is coupled with the first cover 310 so that it is stably seated and fixed.

The first rail groove 411 is formed in such a manner that a portion of the center of the bottom surface of one side of the slider 410 extending forward and rearward is depressed upward by a predetermined distance so that the inner space thereof is open downward, forward, and rearward.

The first protrusion 412 is formed in a cylindrical shape extending to both sides, is connected to the bottom of one side of the slider 410 at the center of the first rail groove 411, and is inserted into any one of the first and second catch depressions 371 and 373 according to the moving direction of the slider 410.

The second rail groove 413 is formed in such a manner that a portion of the center of the top surface of one side of the slider 410 extending forward and rearward is depressed downward by a predetermined distance so that the inner space thereof is open upward, forward, and rearward.

The second protrusion 414 is formed in a cylindrical shape extending to both sides, is connected to the top of one side of the slider 410 at the center of the second rail groove 413, and is inserted into any one of the first and second catch depressions 381 and 383 according to the moving direction of the slider 410.

Referring to FIGS. 4 to 6, in the state in which the locking part 400 has been moved rearward, the first and second protrusions 412 and 414 are inserted into the first catch depressions 371 and 381, respectively. When the locking part 400 is moved forward with a first pressure or less, the movement of the locking part 400 is suppressed.

When the locking part 400 is moved forward by the first distance by applying a pressure exceeding the first pressure, the first and second protrusions 412 and 414 pass through the first and second stop protrusions 372 and 382 and are inserted into the second catch depressions 373 and 383, respectively.

In the process in which the locking part 400 is moved forward, the first and second protrusions 412 and 414 elastically deform the first cover 310, and move forward while increasing the distance between the first and second stop protrusions 372 and 382.

The lower portion of the first cover 310 is made of a material having higher elasticity than the upper portion of the first cover 310. In the process in which the locking part 400 is moved, the distance by which the first stop protrusion 372 is moved downward is longer than the distance by which the second stop protrusion 382 is moved upward.

When the locking part 400 is moved rearward by the first distance by applying a pressure exceeding the first pressure, the first and second protrusions 412 and 414 pass through the first and second stop protrusions 372 and 382 and are inserted into the first catch depressions 371 and 381, respectively.

In the process in which the locking part 400 is selectively moved forward and rearward, each of the first rails 370 and 374 maintains the state of being inserted into the first rail groove 411 at a position corresponding to a position in front of or behind the first protrusion 412, and guides the locking part 400 through the movement thereof.

In the process in which the locking part 400 is selectively moved forward and rearward, each of the second rails 380 and 384 maintains the state of being inserted into the second rail groove 413 at a position corresponding to a position in front of or behind the second protrusion 414, and guides the locking part 400 through the movement thereof.

Referring to FIGS. 4 to 6 and 10, the stopper 420 is formed in the shape of a hexahedron having a smaller length between both side surfaces thereof than one side of the slider 410 and extending upward and downward. In the insertion space 405, the top of the stopper 420 is connected to the top of one side of the slider 410, and the bottom of the stopper 420 is connected to the bottom of one side of the slider 410.

The insertion recess 423 is formed in such a manner that a portion of one side of the front of the stopper 420 is recessed toward the other side by a predetermined distance. When the locking part 400 is moved rearward and the other end of the pressing member 320 is elastically moved toward the other side, a portion of the insertion member 322 is elastically deformed and inserted into the insertion recess 423.

When a portion of the insertion member 322 is inserted into the insertion recess 423, the phenomenon in which the locking part 400 is moved forward while being pushed by the insertion member 322 is prevented, the deformation of the pressing member 320 by the locking part 400 is effectively prevented, and the operation of the first button 11 of the protruding member 330 is stably suppressed.

Furthermore, the stop member 360 blocks the locking part 400 from being separated from the operation unit 300 and moving toward the hollow 5 or the product 10 by the pressure of the pressing member 320 applied to the stopper 420. Accordingly, the locking part 400 stably suppresses the deformation of the pressing member 320.

Referring to FIGS. 4 and 5, the connecting member 421 gradually extends rearward while contracting up to a forward position relative to the rear surface of the slider 410 while maintaining the state in which a portion of the bottom of the stopper 420 is in close contact with the bottom of one side of the slider 410 and the other side of the slider 410.

The connecting member 422 gradually extends rearward while contracting up to a forward position relative to the rear surface of the slider 410 while maintaining the state in which a portion of the top of the stopper 420 is in close contact with the top of one side of the slider 410 and the other side of the slider 410.

Referring to FIGS. 4 and 5, a curved member 424 is manufactured by tapering the rear edge of one side of the stopper 420. The curved member 424 guides a portion of the other end of the pressing member 320 corresponding to the front of the buffer members 340 and 350 to be smoothly inserted into the insertion space 405 located behind the stopper 420.

Figure 7A:
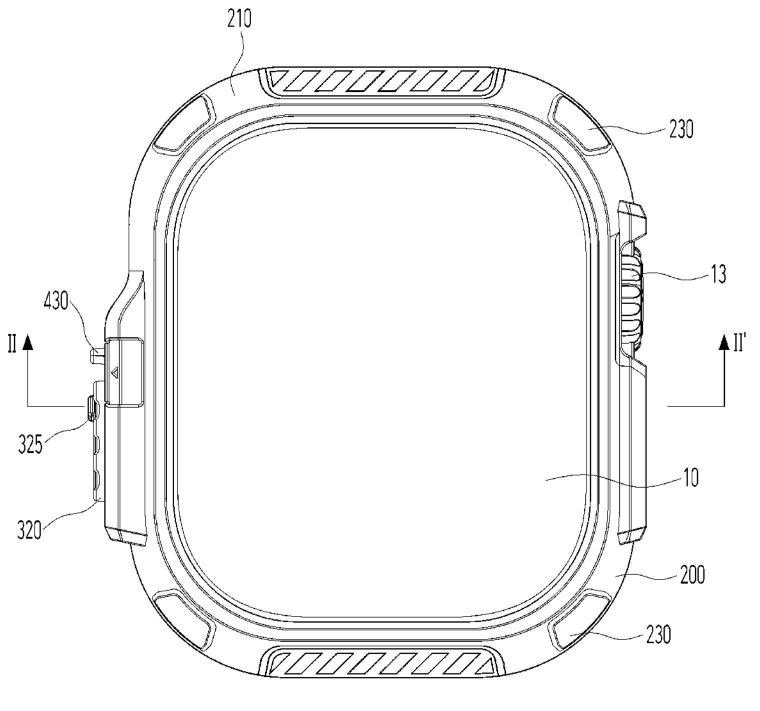
FIG. 7A shows a plan view of the protective case of FIG. 1.
Figure 7B:
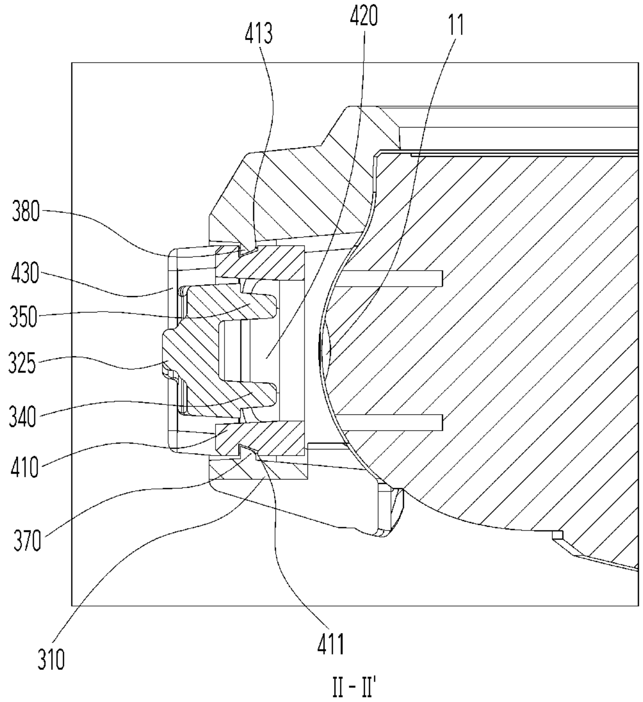
FIG. 7B shows an enlarged partial sectional view taken along line II-II' of the plan view of FIG. 7A.
Figure 8A:
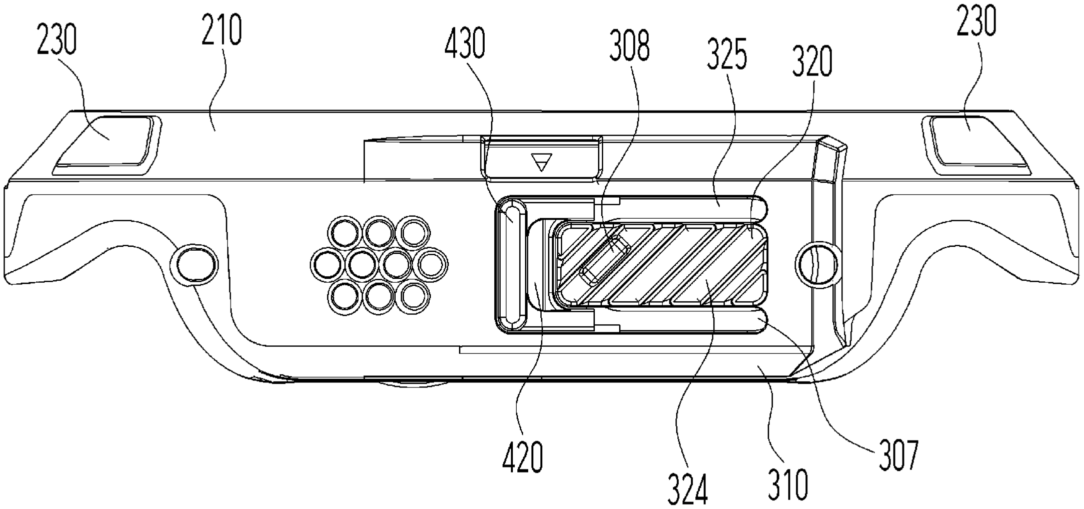
FIGS. 8A and 8B show schematic side views showing a state in which the locking part of the protective case of FIG. 1 is slid rearward and a state in which the locking part of the protective case of FIG. 1 is slid forward, respectively.
Figure 8B:
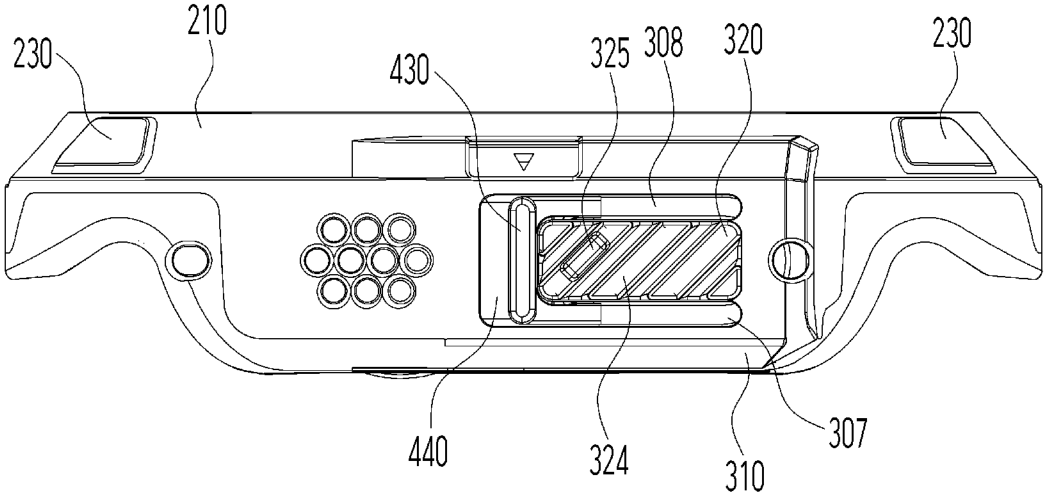
Figure 9A:
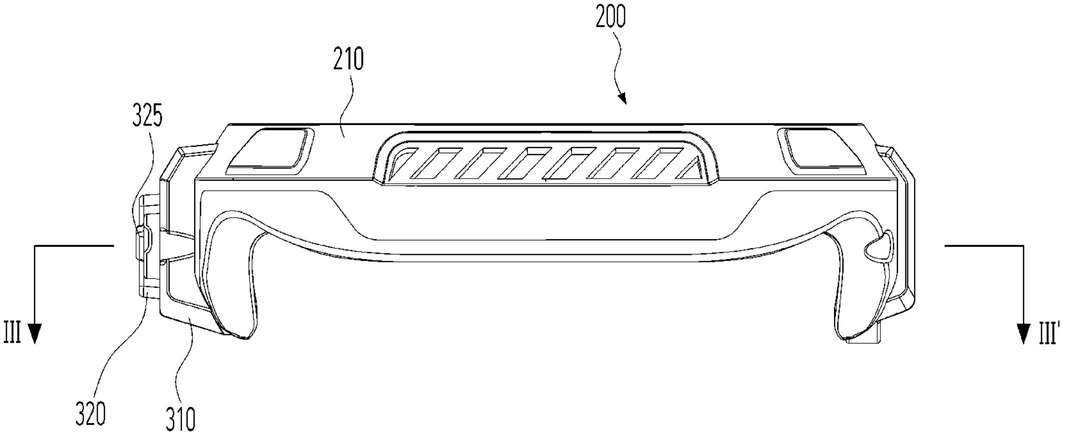
FIG. 9A shows a side view of the protective case of FIG. 1 viewed from the rear.
Figure 9B:
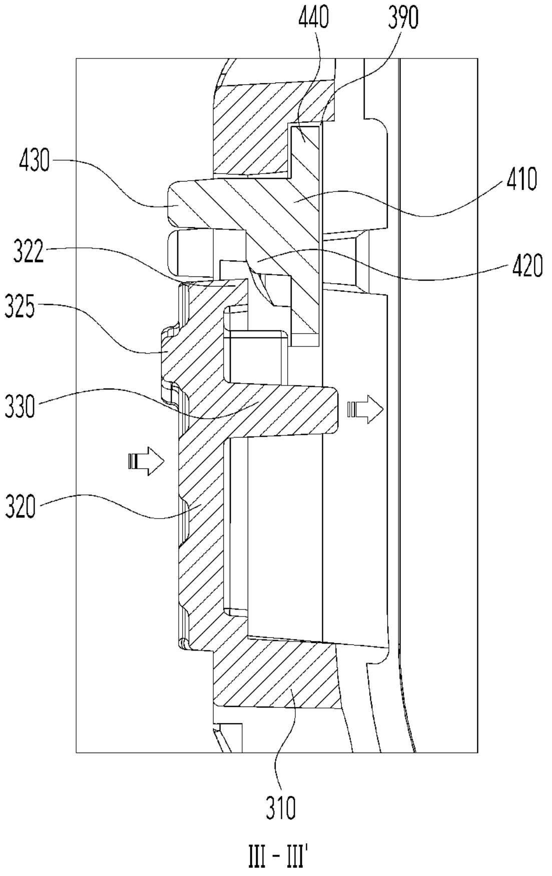
FIG. 9B shows a partial sectional view taken along line III-III' of the side view of FIG. 9A in the state in which the locking part has been moved forward.

Referring to FIGS. 6, 7 and 9, when a portion of the other end of the pressing member 320 corresponding to the front of the buffer members 340 and 350 is elastically moved toward the other side in the state in which the locking part 400 has been moved forward, the connection members 421 and 422 guide the insertion member 322 to move smoothly toward the rear of the stopper 420 while coming into contact with the insertion member 322.

Referring to FIGS. 4, 6, 9 and 10, one end of the lever 430 is formed in the shape of a plate extending vertically and is connected to one side of the slider 410 located in front of the insertion space 405, and the other end of the lever 430 extends toward one side to protrude to one side relative to the first cover 310, the pressing member 320, and the oblique linear protrusions 324.

Referring to FIG. 9, a user may conveniently slide the locking part 400 forward or backward through the operation of moving the lever 430 forward or backward. In the state in which the locking part 400 has been moved forward, the pressing member 320 is changed to the state in which elastic movement is possible, and the first button 11 may be operated through the pressing member 320.

When the lever 430 is moved forward by the first distance, the front surface of the lever 430 comes into close contact with the inner surface of the front side of the first cover 310, and the guide member 440 is inserted into the sliding groove 390, so that the forward movement of the locking part 400 is restricted.

The stop member 360 prevents the situation in which the lever 430 collides with the first cover 310 due to the forward movement of the lever 430 by a user and the front of the other side of the slider 410 is tilted and moved toward the other side and separated toward the product 10.

Referring to FIG. 10, when the lever 430 is moved rearward by the first distance, the rear surface of the lever 430 is brought into close contact with the front surface of the other end of the pressing member 320, and the rear surface of the other side of the slider 410 is brought into close contact with the front surface of the protruding member 330 and then stopped, and the elastic movement of the pressing member 320 toward the other side is blocked by the stopper 420.

Referring to FIGS. 6 and 10, when the other end of the pressing member 320 is moved to the other side in the state in which the lever 430 has been moved rearward, the insertion member 322 is inserted into the insertion recess 423 and the locking part 400 is prevented from being slid forward by the pressure of the pressing member 320, so that the movement of the pressing member 320 is effectively suppressed by the stopper 420.

In the state in which the insertion member 322 has been inserted into the insertion recess 423, the other end of the protruding member 330 is disposed in the state of being spaced apart from the first button 11 by a predetermined distance, and the movement of the protruding member 330 toward the first button 11 is suppressed by the stopper 420.

Referring to FIG. 9, when the lever 430 is slid forward by the first distance in the state of being in close contact with the pressing member 320, the front of the lever 430 stops moving while coming into close contact with the inner surface of the front side of the first cover 310.

In the state in which the front of the lever 430 and the first cover 310 are in close contact with each other, a portion of the other end of the pressing member 320 corresponding to the front of the buffer members 340 and 350 is moved by a predetermined distance toward the insertion space 405 corresponding to the rear of the stopper 420, and the buffer members 340 and 350 are moved to the other side of the slider 410.

When the other end of the pressing member 320 corresponding to the front of the buffer members 340 and 350 is moved to the insertion space 405 corresponding to the rear of the stopper 420, the protruding member 330 is moved toward the other side, and moves the first button 11 toward the other side and operates the first button 11.

One end of the guide member 440 is formed in the shape of a plate extending vertically and connected to the front of the other side of the slider 410, and the other end thereof extends by a predetermined distance toward the sliding groove 390 in front of it. The front-rear distance of the guide member 440 is fabricated to be equal to or longer than the first distance.

In the state in which the locking part 400 has been slid forward, the front surface of the lever 430 comes into close contact with the first cover 310, and the front surface of the other end of the guide member 440 is inserted into the sliding groove 390 and comes into close contact with the inner surface of the front side of the first cover 310.

When a portion of the other end of the pressing member 320 is moved to a position corresponding to the rear of the stopper 420 by the operation of a user in the state in which the locking part 400 has been slid forward, the protruding member 330 comes into close contact with the first button 11 and moves the first button 11 toward the other side.

When the pressing member 320 presses the other side of the slider 410 in the state in which the locking part 400 has been slid forward, the locking member 360 effectively suppresses the separation of the locking part 400 from the operation unit 300 by maintaining the position of the slider 410.

Referring to FIGS. 4 to 6, in the state in which the locking part 400 has been slid forward, each of the first and second protrusions 412 and 414 is inserted into each of the second catch depressions 373 and 383. The first and second catch depressions 372 and 382 prevent the position of the locking part 400 from being changed by an external force equal to or lower than the first pressure applied to the lever 430, so that the state in which the first button 11 is operated through the pressing member 320 is stably maintained.

In the state in which the locking part 400 has been slid backward, the buffer members 340 and 350 are inserted into the insertion space 405 corresponding to the rear of the stopper 420, and the other side of the slider 410 suppresses the movement of the other side of the buffer members 340 and 350.

In the state in which the locking part 400 has been slid backward, the rear surface of the lever 430 comes into close contact with the front surface of the other end of the pressing member 320, and the guide member 440 is separated from the sliding groove 390 and disposed in the first space 306.

In the state in which the locking part 400 has been slid backward, when the pressing member 320 presses the stopper 420, the movement of the protruding member 330 to the other side is blocked, and the operation of the first button 11 is suppressed.

Referring to FIGS. 4 to 6, in the state in which the locking part 400 has been slid backward, each of the first and second protrusions 412 and 414 is inserted into each of the first catch depressions 371 and 381. The first and second catch depressions 372 and 382 prevent the position of the locking part 400 from being changed by an external force of a predetermined magnitude or less applied to the lever 430, so that the phenomenon in which the pressing member 320 is erroneously operated and operates the first button 11 is effectively prevented.

| | | Test Result | | | | | |
|---|---|---|---|---|---|---|---|
| NO | Test Mode | Before test | 500 times | 1,000 times | 1,500 times | 2,000 times | Judgement |
| #3 | Operation durability | OK | OK | OK | OK | OK | OK |
| | | 2,500 times | 3,000 times | 3,500 times | 4,000 times | — | |
| | | OK | OK | OK | OK | | |

Table 1 above shows the results of the durability tests of the locking part 400 conducted in such a manner that moving the locking part 400 backward and then moving it back forward was set to once and the operation of the locking part 400 was repeated. The results show that the function and durability of the locking part 400 were maintained even when the operation of the locking part 400 was repeated up to 4,000 times.

Even when the operation of the locking part 400 was repeated up to 4,000 times, the first and second protrusions 412 and 414 were inserted into the first catch depressions 371 and 381, respectively, to stably maintain the position of the locking part 400, and the erroneous operation of the first button 11 attributable to the external force applied to the pressing member 320 regardless of the intention of a user was effectively prevented.

In addition, even when the operation of the locking part 400 was repeated up to 4,000 times, the first and second protrusions 412 and 414 were inserted into the second catch depressions 373 and 383, respectively, to stably maintain the position of the locking part 400, and the phenomenon in which the locking part 400 was moved backward regardless of the intention of a user to suppress the operation of the first button 11 by the pressing member 320 and the protruding member 330 was prevented.

Figure 11A:
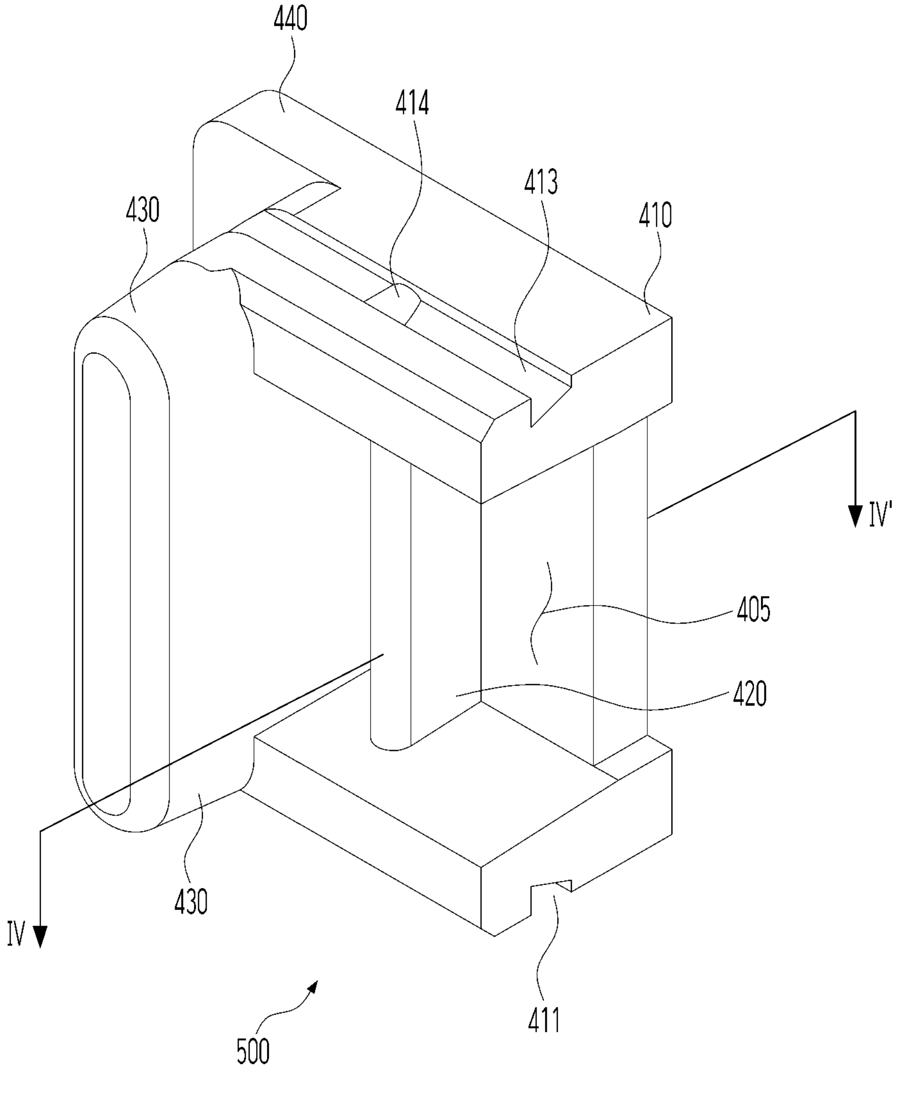
FIG. 11A shows an enlarged perspective view of a locking part of a protective case according to another embodiment of the present disclosure.
Figure 11B:
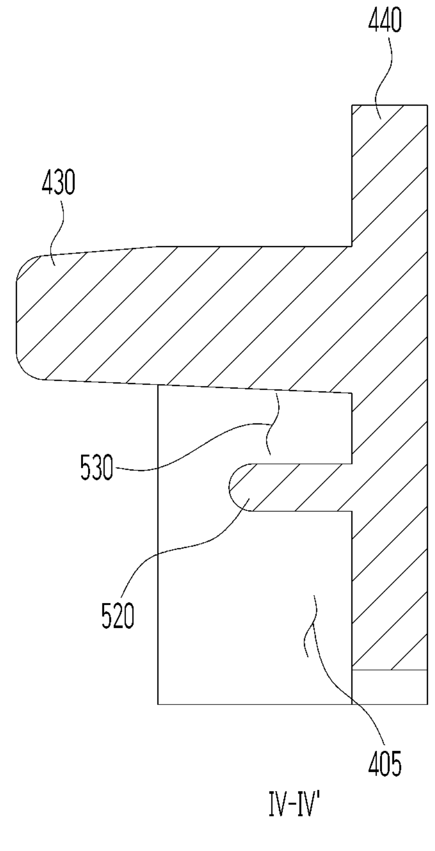
FIG. 11B shows a sectional view of the locking part of the protective case taken along line IV-IV' of FIG. 11A.

As shown in FIG. 11, the protective case according to the present embodiment is substantially the same as the protective case 100 of FIGS. 1 to 10 except for a locking part 500, and thus the same reference numerals and names of components will be used, and redundant descriptions will be omitted.

The locking part 500 is substantially the same as the locking part 400 of FIGS. 1 to 10 except for a stopper 520 and an insertion recess 530, and thus the same reference numerals and names of components will be used and redundant descriptions will be omitted.

The locking part 500 includes a slider 410, a first protrusion 412, a second protrusion 414, the stopper 520, a lever 430 and a guide member 440, and an insertion space 405, a first rail groove 411, a second rail groove 413, and the insertion recess 530 are formed in the locking part 500.

The stopper 520 is formed in the shape of a plate having a smaller length between both sides thereof than one side of the slider 410 and extending upward and downward. In the insertion space 405, the top of the stopper 520 is connected to the top of one side of the slider 410, and the bottom thereof is connected to the bottom of one side of the slider 410.

The insertion recess 530 is formed between the front surface of the stopper 520 and the inner surface of the front of one side of the slider 410. When the locking part 500 is moved backward and the other end of the pressing member 320 is elastically moved toward the other side, a portion of the insertion member 322 is elastically deformed and inserted into the insertion recess 530.

When a portion of the insertion member 322 is inserted into the insertion recess 530, the phenomenon in which the locking part 500 is moved forward while being pushed by the insertion member 322 is prevented, the deformation of the pressing member 320 by the locking part 500 is effectively prevented, and the operation of the first button 11 by the protruding member 330 is stably suppressed.

In addition, the stop member 360 blocks the locking member 360 from being separated from the operation unit 300 by the pressure of the pressing member 320 applied to the stopper 520 and being moved toward the hollow 5 or the product 10. Accordingly, the locking part 500 stably suppresses the deformation of the pressing member 320.

In the state in which the locking part 500 has been slid forward, the front surface of the lever 430 comes into close contact with the first cover 310, and the front surface of the other end of the guide member 440 is inserted into the sliding groove 390 and comes into close contact with the inner surface of the front side of the first cover 310.

In the state in which the locking part 500 has been slid forward, when a portion of the other end of the pressing member 320 is moved to a position corresponding to the rear of the stopper 520 by the operation of a user, the protruding member 330 comes into close contact with the first button 11 and moves the first button 11 to the other side.

In the state in which the locking part 500 has been slid forward, when the other end of the pressing member 320 presses the other side of the slider 410 in the insertion space 405 located behind the stopper 520, the stop member 360 maintains the position of the slider 410 so that the slider 410 is not separated toward the other side.

When the locking part 500 is moved backward, the buffer members 340 and 350 are inserted into the insertion space 405 located behind the stopper 520, and the other side of the slider 410 suppresses the movement of the buffer members 340 and 350 to the other side.

In the state in which the locking part 500 has been slid rearward, when the pressing member 320 is moved toward the other side, the movement of the other end of the pressure member 320 and the buffer members 350 and 360 to the other side is blocked by the other side of the slider 410, and the operation of the first button 11 is blocked.

According to one embodiment disclosed herein, the protective case is detachably coupled to a product including a watch, so that there may be advantages in that parts of the product can be protected and the function of the pressing member, which operates the button of the product by pressing it, can be conveniently and rapidly controlled through the locking part.

Furthermore, the protection case is coupled with the operation unit of the cover part in an stop protrusion manner in the state in which the locking part has been slid forward or backward, so that there is an advantage in that a first state in which the pressing member of the operation unit can operate the button of the product by means of the locking part and a second state in which the operation of the button by the pressing member is blocked are stably maintained.

Furthermore, the operation unit of the cover part includes the first cover surrounding the through hole open on both sides, the other end of the pressing member is formed to elastically move toward the other side in the through hole, and the protruding member protrudes toward the button between one end and the other end of the pressing member. Accordingly, even in the state of wearing gloves, the button may be operated conveniently through the pressing member and the protruding member.

Furthermore, the tops, bottoms, rears and fronts of the pressing member and the protruding member are covered by the first cover, so that there is an advantage in that the erroneous operation of the button, which may be generated by the movement of the pressing member attributable to an external factor such as the collar of a garment, can be prevented.

Furthermore, the locking part is coupled to the operation unit in a stop protrusion manner so that only forward and backward sliding movement by the locking member are enabled in the process of being detachably coupled to the operation unit, so that there is an advantage in that stable sliding movement is maintained between the pressing member and the stop member and the maintenance or replacement of the locking part is facilitated.

Furthermore, the other side of the stop member is processed to be tapered such that an inclined surface extending obliquely from the other side toward one side and the top is formed, and thus it is easy to couple the locking part and the operation unit to each other and it is relatively difficult to separate the locking part and the operation unit from each other, so that there is an advantage that the stable sliding movement of the locking part is possible for a long time.

Furthermore, the slider is formed in the shape of a channel that surrounds the front and upper and lower parts of the pressing member and connects the spaces on both sides, so that there is an advantage in that a portion of the other end of the pressing member is guided to be inserted into the insertion space surrounding the slider.

Furthermore, the locking part is formed such that the length protruding to one side increases in ascending order of the length protruding to one side as the blocks whose length between both sides thereof increases stepwise are arranged toward the front in ascending order of the length between both sides, so that there is an advantage in that the button can be operated such that the distance by which the pressing member can move toward the button increases in accordance with the distance by which the locking part is moved forward.

Furthermore, the distance by which the pressing member can be moved toward the button decreases in accordance with the distance by which the locking part is moved backward, so that there is an advantage in that the button operation function performed by the pressing member can be effectively controlled by a simple structure requiring a reduced manufacturing cost.

Furthermore, the oblique linear protrusions that extend obliquely to be parallel to each other and are spaced apart from each other at equal intervals in the forward direction are formed on one side of the pressing member, and the pressure protrusion is formed by allowing a part of the oblique linear protrusions to protrude to be longer than the oblique linear protrusions toward one side. Accordingly, there is an advantage in that the pressing position of the pressing member can be conveniently identified by touch.

Furthermore, the guide member formed on the other side of the slider is selectively inserted into and separated from the sliding groove formed in the first cover, and thus the space between the button and the external space is blocked even when the locking part is moved rearward, so that a foreign material is prevented from entering between the operation unit and the button.

Furthermore, the guide member, along with the stop member, effectively prevents the phenomenon in which the rear of the locking part is moved to the other side by the pressure of the pressing member and separated from the operation unit in the process in which the locking part moves forward and the pressing member operates the button.

Furthermore, the buffer member is formed at the other end of the pressing member, so that there is an advantage in that the durability of the protruding member is improved. Furthermore, there is an advantage in that the movement of the pressing member toward the button is effectively suppressed by being in close contact with the rear of one side of the slider in the situation in which the locking part is moved rearward and pressure is applied to the pressing member.

Furthermore, a portion of the upper and lower portions of the stopper is formed to extend while contracting rearward, and is formed to be elastically deformed by the pressure of the buffer member or the pressing member. Accordingly, there is an advantage in that a soft touch sensation is provided to a user in the process in which the pressing member is moved toward the button or the locking part is moved rearward.

Moreover, a portion of the insertion member formed on the other side of the pressing member is inserted into the insertion recess of the stopper while being deformed in the process in which the locking part is moved forward and the pressing member is moved toward the button. Accordingly, there is an advantage in which the stopper is blocked from being moved while being slid forward by the pressure of the pressing member.

In addition, since the effects of the present invention are naturally exhibited by the above-described configurations regardless of whether the present inventor recognizes them, the above-described effects are merely a few effects based on the foregoing descriptions, and it should not be recognized that the present inventor has described all the effects that have been figured out or are present. In addition, the effects of the present invention should be further determined by the overall description of the specification. Even when an effect is not described in an explicit sentence but it can be recognized through the present specification by a person skilled in the art to which the present disclosure pertains, it should be regarded as the effect described in the present specification.

Although the embodiments of the present invention have been described above with reference to the accompanying drawings, the embodiments described in the present specification and the configurations shown in the drawings are only examples of the present invention, but do not represent all the technical spirit of the present invention. Accordingly, it should be understood that there may be various equivalents and modifications that can replace the embodiments at the time when the present application is filed. Therefore, the embodiments described above should be understood as illustrative and not limitative in all respects. The scope of the present invention is defined by the following claims rather than the detailed description. All changes or modifications derived from the meanings and scopes of the attached claims and their equivalents should be construed as falling within the scope of the present invention.

What is claimed is:

1. A protective case coupled to a product having a button, the protective case comprising:

a cover part including an operation unit configured to operate the button when a pressing member on a first side of the operation unit is moved toward the button on a second side of the operation unit, the cover part being configured to be detachably coupled to the product; and a locking part configured to be coupled to the operation unit to slide between the button and the pressing member in forward and backward directions, the locking part being configured to be selectively spaced apart from the pressing member and disposed adjacent to the pressing member according to a movement to allow or block an operation of the button by the pressing member, wherein the operation unit comprises:

a first cover surrounding a through hole open to the first side and the second side of the operation unit, the first cover being configured to be coupled to the locking part;

the pressing member configured such that a first end thereof is connected to the first cover to be elastically deformed in the through hole and a second end thereof extends forward in a state of being separated from the first cover and intersects a portion of the locking part; and a protruding member configured to extend toward the second side of the operation unit between the first end and the second end of the pressing member and be disposed behind the locking part.

2. The protective case of claim 1, wherein the locking part is configured to be fixed by at least one stop protrusion positioned on the operation unit when moved forward or backward, and the pressing member is movable by a distance that selectively increases and decreases in accordance with forward or backward movement of the locking part.

3. The protective case of claim 1, wherein the operation unit further comprises a stop member configured to protrude from a bottom of the first cover between the locking part and the button and come into close contact with the locking part, the stop member including an inclined surface extending obliquely toward a first side of the stop member and a top on a second side of the stop member.

4. The protective case of claim 3, wherein the locking part comprises:

a slider configured such that a first side of the slider is coupled to the first cover surrounding a front, top and bottom of an insertion space where the pressing member is disposed and a second side of the slider covers a remaining side of the insertion space; and a lever configured such that a portion of the first side of the slider protrudes past the pressing member and slides.

5. The protective case of claim 4, wherein the locking part further comprises a stopper configured such that a portion of the second side of the slider protrudes into the insertion space and a front-rear length of the stopper is shorter than a first distance, which is a distance by which the slider is configured to be moved.

6. The protective case of claim 4, wherein the locking part further comprises a stopper configured such that a portion of the second side of the slider protrudes toward the insertion space while being spaced apart from a front of the first side of the slider to form an insertion recess separated from the insertion space in front of the insertion space.

7. The protective case of claim 6, wherein the slider is configured such that rail grooves into which portions of the operation unit are inserted are disposed in a top and a bottom of the slider, and protrusions are disposed inside the rail grooves.

8. The protective case of claim 7, wherein the operation unit further comprises a stop protrusion protruding from the first cover and extending forward and backward by a first distance, the stop protrusion being configured to be inserted into a corresponding rail groove of the rail grooves while intersecting a corresponding protrusion of the protrusions, and the corresponding protrusion is configured to be moved while elastically deforming the stop protrusion and the first cover when the lever is moved forward or backward by applying a predetermined force or more.

9. The protective case of claim 4, wherein the operation unit further comprises a pressing protrusion protruding from a first side of the second end of the pressing member by a predetermined distance to be longer than the lever.

10. The protective case of claim 5, wherein the operation unit is configured such that a portion of the first cover adjacent to a front of the second side of the slider is depressed forward by the first distance to define a sliding groove having an internal space that is open toward a rear and the second side.

11. The protective case of claim 10, wherein the locking part further comprises a guide member protruding forward from the front of the second side of the slider by the first distance and configured to be selectively inserted into the sliding groove and separated from the sliding groove in response to an operation of the slider.

12. The protective case of claim 5, wherein the operation unit further comprises buffer members configured such that portions of one side of the second end of the pressing member vertically spaced apart from each other extend toward the second side of the operation unit in a state of being connected to the protruding member and are disposed behind the stopper.

* * * * *